S. E. & L. C. O'QUINN.
TURPENTINE GATHERER.
APPLICATION FILED APR. 23, 1912.
1,035,382.
Patented Aug. 13, 1912.
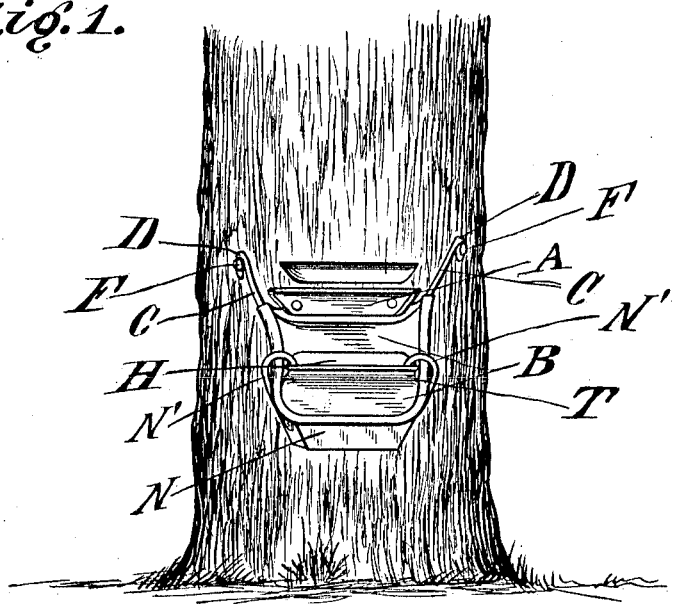
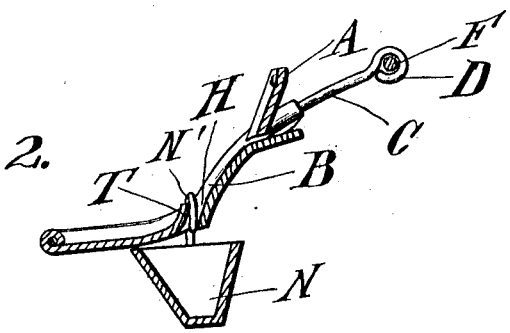

UNITED STATES PATENT OFFICE.

SILAS EDGAR O'QUINN AND LEONARD CLIFTON O'QUINN, OF JESUP, GEORGIA.

TURPENTINE-GATHERER.

1,035,382.

Specification of Letters Patent. Patented Aug. 13, 1912.

Application filed April 23, 1912. Serial No. 692,739.

*To all whom it may concern:*

Be it known that we, SILAS E. O'QUINN and LEONARD C. O'QUINN, citizens of the United States, residing at Jesup, in the county of Wayne and State of Georgia, have invented certain new and useful Improvements in Turpentine-Gatherers; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for gathering turpentine and consists of a simple and efficient device of this nature having various details of construction and combinations and arrangements of parts which will be hereinafter fully described and then specifically defined in the appended claim.

Our invention is illustrated in the accompanying drawings, in which:—

Figure 1 is a perspective view showing the application of the invention to a tree, and Fig. 2 is a sectional view through the device.

Reference now being had to the details of the drawings by letters, A designates a plate which is adapted to be fastened to a tree immediately below the gash formed therein and through which the turpentine exudes, the ends of the plate being preferably slightly outwardly turned. An apron B has a bail-shaped wire C about its marginal edge and which terminates in eyes D which are pivotally mounted upon the pins F driven into the tree at any suitable locations. Said apron has its inner edge concaved and bent slightly, as shown clearly in the drawings and adapted to bind against the bark of the tree below said plate. Said apron is slit transversely as at H with its upper edge downwardly turned, said slit being provided for the purpose of allowing the turpentine to run into a receptacle N having hooks N' which are adapted to engage over the marginal edges of the apron and engage the ends of said slit. A portion of the apron is projected in advance of the receptacle and slit, serving as a cover to the receptacle and slit, serving as a cover to the receptacle and to prevent any foreign matter, such as chips from the tree or rain, from entering the receptacle beneath. In order that the turpentine may not run beyond the slit and avoid going in the receptacle, the lower edge of the slit is upwardly turned as at T.

By the provision of a turpentine gathering device embodying the features of our invention, it will be noted that provision is made for securely holding the device in order to catch all of the turpentine and at the same time affording means for protecting the receptacle from any foreign matter which might otherwise fall therein.

What we claim to be new is:—

A device for gathering turpentine comprising an apron, a wire about the marginal edge thereof and terminating at its ends in eyes which are adapted to be pivotally mounted upon pins driven into the tree, the inner edge of the apron concaved, a plate adapted to be fastened to the tree and project over the inner edge of said apron, said apron having a slit formed therein, one edge of the slit being downwardly turned, a portion of the apron projecting beyond the slit, a receptacle, hooks fastened thereto and adapted to extend over the opposite edges of the apron and engage the ends of said slit, as set forth.

In testimony whereof we hereunto affix our signatures in the presence of two witnesses.

SILAS EDGAR O'QUINN.
LEONARD CLIFTON O'QUINN.

Witnesses:
T. N. EVANS,
D. C. RICHARDSON.

Copies of this patent may be obtained for five cents each, by addressing the "Commissioner of Patents, Washington, D. C."